G. A. DAMRON.
VEHICLE SIGNAL.
APPLICATION FILED DEC. 16, 1913.
1,175,615.
Patented Mar. 14, 1916.
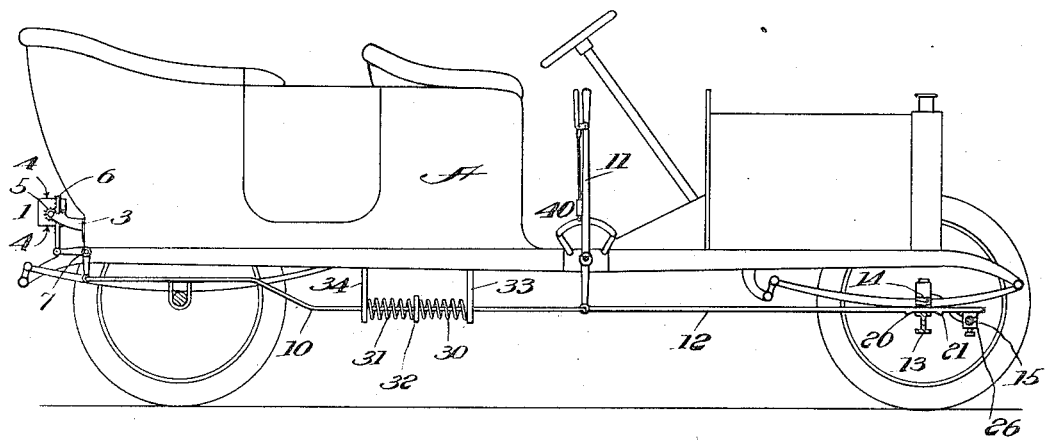
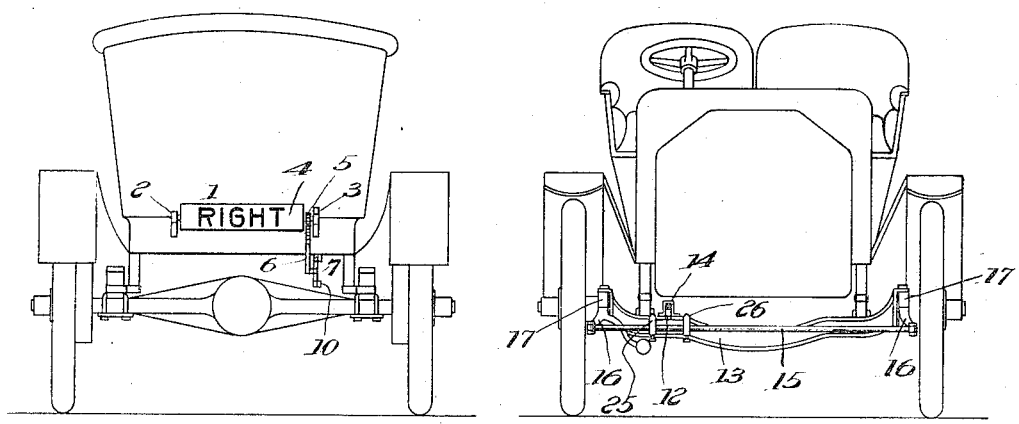
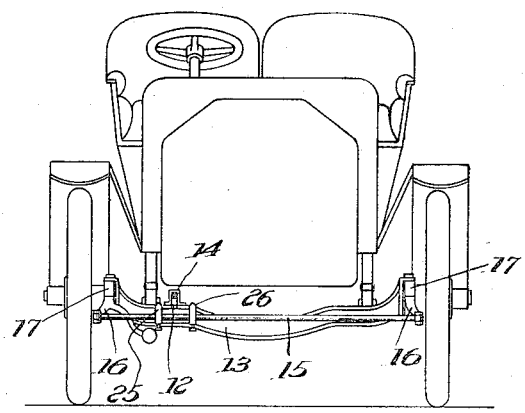
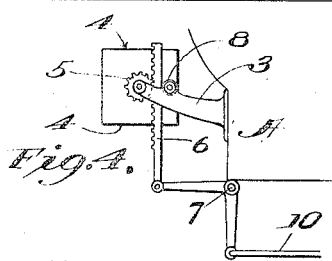
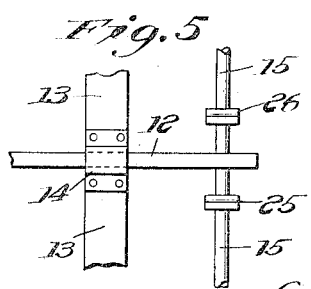
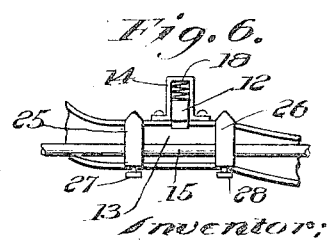
Witnesses:
Alan Franklin.
Jully Russo.
Inventor:
George A. Damron
by Sjoust Hadley
atty.

UNITED STATES PATENT OFFICE.

GEORGE A. DAMRON, OF LOS ANGELES, CALIFORNIA.

VEHICLE-SIGNAL.

1,175,615.

Specification of Letters Patent.  Patented Mar. 14, 1916.

Application filed December 16, 1913. Serial No. 806,958.

*To all whom it may concern:*

Be it known that I, GEORGE A. DAMRON, a citizen of the United States, residing at Los Angeles, in the county of Los Angeles and State of California, have invented a new and useful Vehicle-Signal, of which the following is a specification.

This invention is a signal adapted to be used on an automobile and operated by the driver of the automobile, to indicate a maneuver about to be made by the automobile.

The object of the invention is to provide improved means for automatically restoring the signal to non-signaling position, after the signal has indicated a particular maneuver of the automobile.

Another object is to provide means for positively locking the signal in signaling position.

Referring to the drawings: Figure 1 is a view partly in side elevation and partly in longitudinal section, of an automobile equipped with my invention. Figs. 2 and 3 are respectively a rear and a front elevation of an automobile equipped with my invention. Fig. 4 is an enlarged view of certain parts of the mechanism for turning the semaphore of the signal. Figs. 5 and 6 are respectively a plan and a front view on an enlarged scale of parts of the mechanism for automatically restoring the semaphore to non-signaling position.

The semaphore 1 is rotatably mounted in brackets 2 and 3, secured to the rear of the automobile. The semaphore is provided with a plurality of indicating faces 4 upon which are respectively placed the words "Right" and "Left" adapted to indicate that the automobile is about to turn to the right or left. A pinion 5 fixed upon the semaphore 1 meshes with a rack 6 connected to one arm of bell crank lever 7, which is pivoted upon the automobile framework. A roller 8 journaled in bracket 3 engages the rack 6 and maintains the teeth of the rack in mesh with the teeth of the pinion 5. To the other arm of bell crank lever 7 is connected one end of rod 10, the other end of which is connected to the lower end of an operating lever 11, pivoted upon the automobile where it may be readily grasped by the driver. Pivoted at its rear end to the lower end of lever 11 is a detent bar 12, the forward portion of which is slidably mounted upon the front axle 13 of the automobile, within guide 14, and its extremity rests over the tie rod 15 which connects the arms 16 of the steering knuckles 17 of the front wheels of the automobile. A spring 18 located within the guide 14 engages the bar 12 and normally maintains the bar in engagement with the axle 13. The bar 12 is provided on its under side with teeth 20 and 21 which are adapted respectively to engage the front axle 13 to hold the semaphore temporarily in its respective signaling positions, as will be hereinafter more fully described.

A pair of cams 25 and 26 which are adjustably secured to the tie rod 15 by set screws 27 and 28, are adapted to engage the detent bar and disengage the teeth 20 and 21 from the axle 13 when the automobile turns in either direction, as will be hereinafter more fully described. A pair of springs 30 and 31 surround the rod 10 and rest respectively between collar 32, which is secured to the rod and bracket 33, and between said collar and bracket 34, which brackets are secured to framework of the automobile, the purpose of which springs is to maintain the teeth 20 and 21 in engagement with the axle 13, to hold the semaphore in signaling position and to restore the semaphore to non-signaling position when the automobile has made the maneuver indicated by the semaphore and the teeth 20 and 21 are disengaged from the axle 13 by the cams 25 and 26. A locking element 40 is provided for locking the lever 11 and the rest of the signal mechanism in neutral position, and the semaphore in non-signaling position.

The operation is as follows: Assuming the signal mechanism to be in the position illustrated in Fig. 1 of the drawing, and the driver of the automobile intends to turn the automobile to the right and desires to give notice of such intended maneuver of the automobile; the driver grasps the lever 11 and draws it rearwardly; as said lever is drawn rearwardly the rod 10 is drawn forwardly against the tension of the spring 30 until the spring is compressed to its limit of compression, the semaphore 1 is rotated through the medium of pinion 5, rack 6 and bell crank lever 7, until the surface 4 upon which appears the word "Right" is exposed to view, thereby indicating that the automobile is about to turn to the right, and the bar 12 is moved forwardly until the tooth 20 passes over the front axle 13 of the automobile; the driver then releases the lever 11, whereupon the spring 30 draws the bar 12 rearwardly and the tooth 20 into engagement with the front edge of the axle 13 which locks the semaphore in signaling position with the word "Right" exposed to view; as the front wheels of the automobile turn to the right and the rod 15 is drawn to the right, the cam 26 engages the extremity of the bar 12 and lifts said bar, disengaging the tooth 20 from the axle, whereupon the spring 30 draws the bar 12 rearwardly until the tooth 20 rests in the rear of axle 13, and the rod 10 rearwardly until the semaphore 1 is rotated through the medium of bell crank lever 7, rack 6 and pinion 5, back to its non-signaling position, as illustrated in Fig. 1 of the drawing. If the driver intends to turn the automobile to the left and desires to give notice of such intended maneuver of the automobile, he grasps the lever 11 and moves it forwardly, and as said lever is so moved, the rod 10 is moved rearwardly against the tension of spring 31 until said spring is compressed to its limit of compression. The semaphore 1 is rotated through the medium of pinion 5, rack 6 and bell crank lever 7 until the surface 3 of the semaphore upon which appears the word "Left" is exposed to view, thereby indicating that the automobile is about to turn to the left and the bar 12 is moved rearwardly until the tooth 21 passes over the front axle 13 of the automobile. The driver then releases the lever 11, whereupon the spring 31 draws the bar 12 forwardly and the tooth 21 into engagement with the rear edge of the axle 13, which locks the semaphore in signaling position with the word "Left" exposed to view. As the front wheels of the automobile turn to the left and the rod 15 is drawn to the left, the cam 25 engages the forward extremity of the bar 12 and lifts said bar, disengaging the tooth 21 from the axle, whereupon the spring 31 moves the bar 12 forwardly until the tooth 21 rests in front of the axle 13 and the rod 10 forwardly until the semaphore is rotated through the medium of bell crank lever 7, rack 6 and pinion 5, back to its non-signaling position.

What I claim is:

1. In combination with a vehicle steering mechanism, a signal on the vehicle for indicating a maneuver about to be made by the vehicle, means for setting said signal in signaling position, locking means to lock said signal positively in signaling position, means actuated by said steering mechanism for engaging said locking means to unlock said signal when the vehicle makes the maneuver indicated by the signal, and means independent of the steering mechanism for restoring the signal to non-signaling position when the signal is unlocked.

2. In combination with a vehicle, a semaphore rotatably mounted on said vehicle, a rod, a lever connected to said rod for reciprocating the rod, means intermediate said rod and said semaphore whereby the semaphore is rotated into signaling position when said rod is reciprocated, a collar on said rod, a bracket on the vehicle, a spring surrounding said rod between said collar and said bracket, another bracket on the vehicle, another spring surrounding said rod between said collar and said second bracket, said first spring adapted to restore the semaphore to non-signaling position when the rod has been reciprocated in one direction to cause the semaphore to indicate a maneuver of the vehicle, and said second spring adapted to restore the semaphore to non-signaling position when the rod has been reciprocated in the other direction to cause the semaphore to indicate another maneuver of the vehicle.

3. In combination with the steering knuckle tie rod of an automobile, a signal on the vehicle for indicating a turn about to be made by the vehicle. means for setting said signal in signaling position, a detent element connected to said signal setting means to lock the signal in signaling position, a cam on said tie rod for engaging said detent element to unlock said signal when the vehicle has turned in the direction indicated by the signal, and means for restoring the signal to non-signaling position when the signal is unlocked.

4. In combination with a connecting rod of the steering mechanism of an automobile, a signal on the vehicle for indicating a maneuver about to be made by the vehicle, means for setting said signal in signaling position, locking means adapted to lock said signal in signaling position, a cam on said connecting rod for engaging said locking means to cause said locking means to unlock said signal when the vehicle makes the maneuver indicated by the signal, and means for restoring the signal to non-signaling position when the signal is unlocked.

5. The combination with a steering mechanism of a vehicle including a connecting rod, of a signal on the vehicle for indicating a maneuver about to be made by the vehicle, means for setting said signal in signaling position, means for locking said signal in signaling position, means on said connecting rod for engaging said locking means to cause said locking means to unlock said signal when the vehicle makes a maneuver indicated by the signal, and means for restoring the signal to non-signaling position when said signal is unlocked.

In testimony whereof, I have hereunto set my hand at Los Angeles, California, this 9th day of December, 1913.

GEORGE A. DAMRON.

In presence of—
ALAN FRANKLIN,
LORRAINE E. DURROW.

Copies of this patent may be obtained for five cents each, by addressing the "Commissioner of Patents, Washington, D. C."